Dec. 14, 1948.   M. B. ANDERSON   2,456,478
SELECTIVE PROPULSION MEANS FOR AMPHIBIOUS CRAFT
Filed Jan. 15, 1944   3 Sheets-Sheet 3
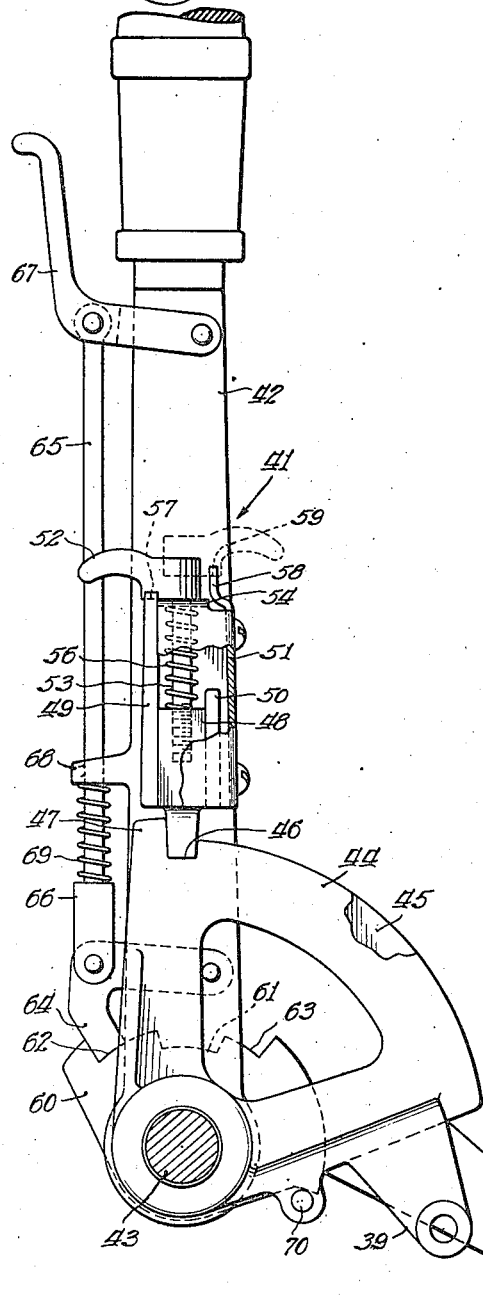
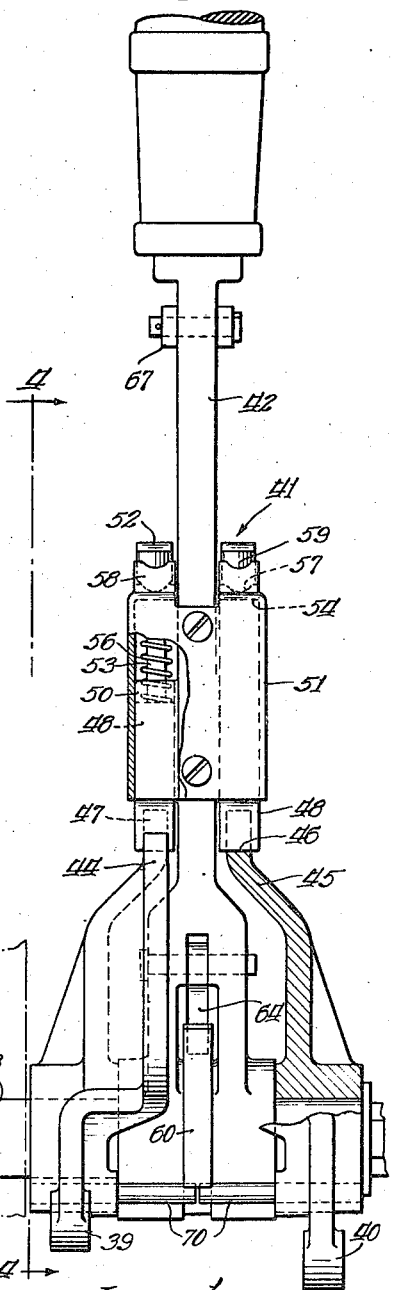
Inventor:
Milton B. Anderson
By Edward C. Britzbough
Atty.

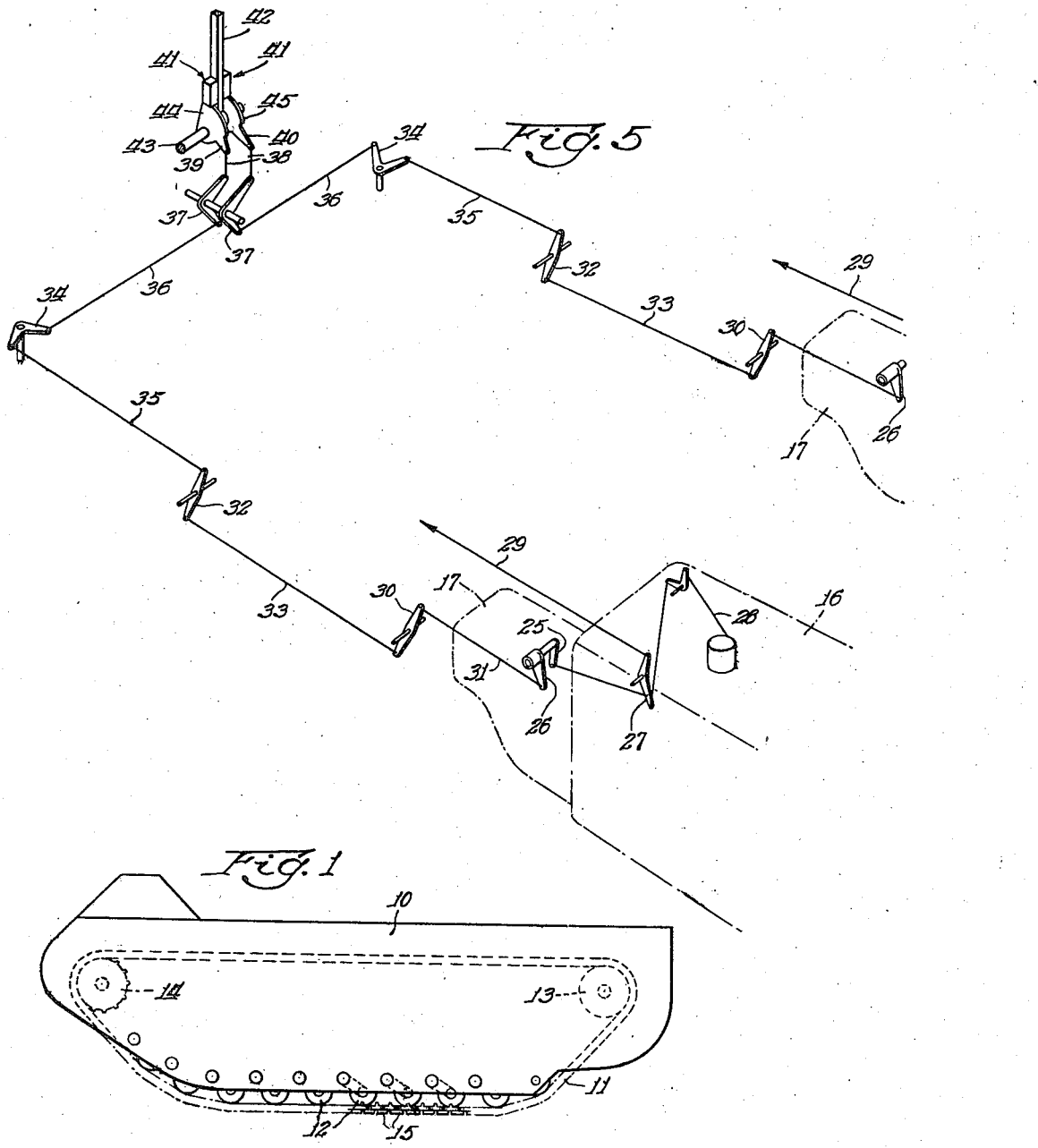

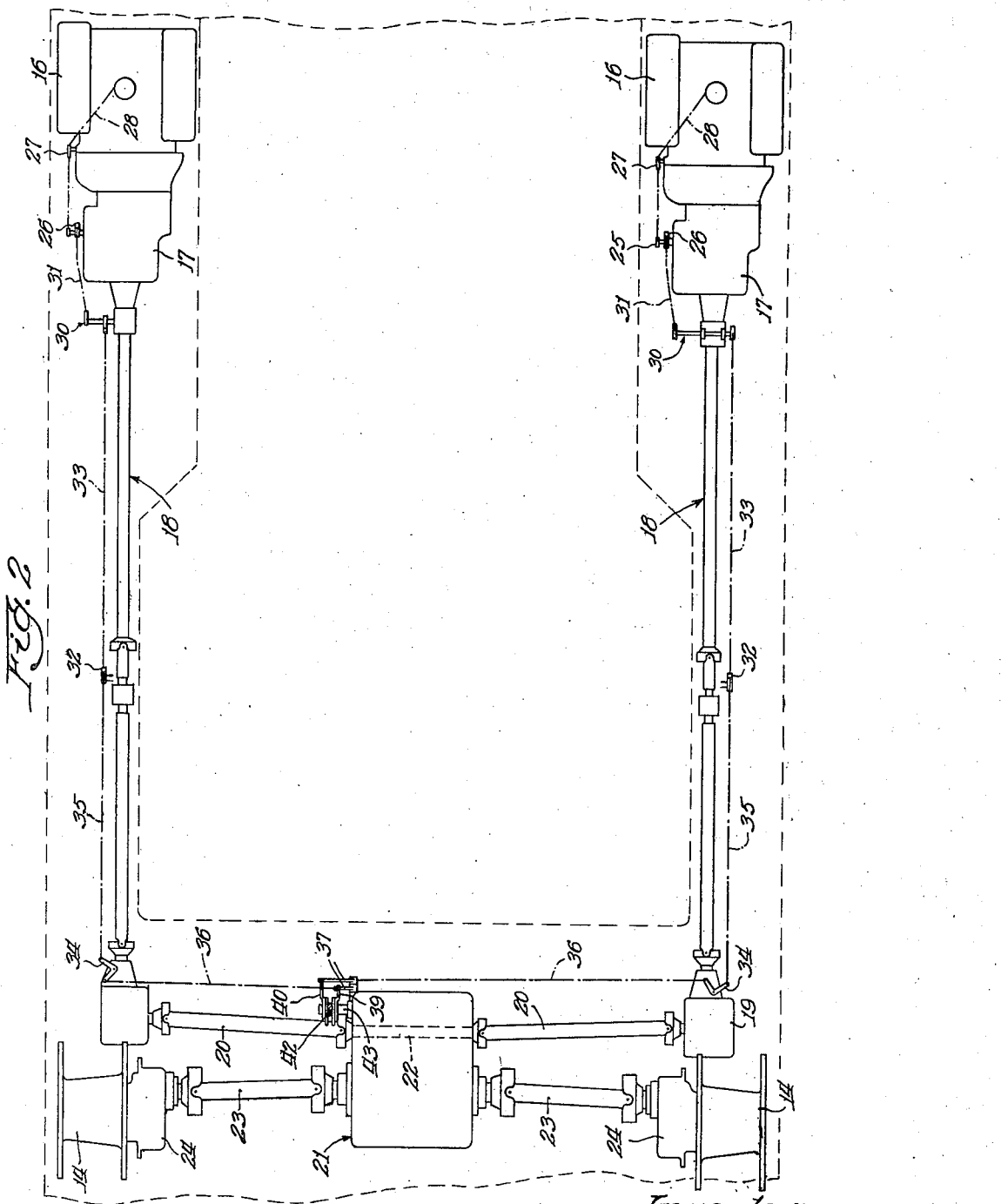

Patented Dec. 14, 1948

2,456,478

UNITED STATES PATENT OFFICE 2,456,478

SELECTIVE PROPULSION MEANS FOR AMPHIBIOUS CRAFT

Milton B. Anderson, Rockford, Ill., assignor, by mesne assignments, to the United States of America as represented by the Secretary of the Navy Application January 15, 1944, Serial No. 518,364

20 Claims. (Cl. 115—1)

1

My invention relates to controls for transmissions and more particularly to transmission controls which are particularly suitable for use in a water craft.

In a co-pending application of Benjamin A. Swennes, Serial No. 508,304 filed October 30, 1943, there is disclosed an amphibian vehicle having movable tracks on opposite sides for propelling the vehicle either over land or through the water, and the vehicle is powered by two motors disposed adjacent opposite sides of the vehicle. Each of the motors is connected with the tracks by means of a transmission disposed in tandem with the motor and by other suitable shafting and gearing.

It is contemplated that the transmissions for both motors in this vehicle may be jointly shifted by means of a single control lever suitably connected with shifting levers of the transmissions, and it has been found with such an arrangement that, although the usual poppet means is provided in each of the transmissions for yieldingly holding the shifting lever of the transmission in certain definite positions providing different forward speed ratios, neutral, and reverse, the vehicle operator in controlling the transmissions by means of the single control lever has difficulty in feeling the effect of the poppet means, particularly when the vehicle is traveling through rough seas. It is, therefore, an object of my invention to provide interlocking means effective on the control lever so that the operator may selectively limit the movement of the lever whereby the transmissions may only be shifted to provide their various forward speed ratios. It is contemplated that such interlocking means will function to prevent the operator inadvertently from shifting into neutral or reverse when the vehicle is in rough seas.

In the use of such a vehicle in the water, and particularly in rough seas, trouble has been experienced with one or the other of the motors becoming wet and thereby being rendered inoperative. With one of the motors being inoperative, this motor is a load on the motor still functioning and substantially decreases the power the operative motor is able to supply to the driving tracks. It is thus another object of my invention to provide means for disconnecting the control lever from the transmission of the inoperative motor, whereby the latter transmission may be left in neutral condition while the transmission for the operative motor is shifted in power transmitting condition as desired.

The invention consists of the novel constructions, arrangements, and devices to be herein-

2 after described and claimed for carrying out the above stated objects and such other objects as will appear from the following description of a certain preferred embodiment illustrated in the accompanying drawings, wherein:

Fig. 1 is a side elevational view of an amphibian vehicle provided with a transmission control mechanism embodying the principles of my invention;

Fig. 2 is a plan view on an enlarged scale of the track driving mechanism of the vehicle including a pair of motors and a transmission connected in tandem with each motor and also of the linkages between the transmissions and a control lever therefor;

Fig. 3 is an elevational view on an enlarged scale of the transmission control lever and associated parts;

Fig. 4 is a view taken on line 4—4 of Fig. 3; and

Fig. 5 is a perspective view on an enlarged scale of the transmission control mechanism and the linkages between the mechanism and the transmissions.

Like characters of reference designate like parts in the several views.

Referring now in particular to Fig. 1 of the drawings, the illustrated amphibian vehicle comprises a water tight vehicle body 10 having movably disposed on opposite sides thereof (one side only being shown in the drawing) articulated tracks 11 in looped configuration. The track on each side is held in such configuration by means of bogie wheels 12 on the bottom of the vehicle and wheels 13 and 14 adjacent the top of the vehicle. The wheel 13 is preferably simply an idler wheel while the wheel 14 is a sprocket adapted to engage with the articulated track for driving the track. The tracks 11 are provided with lugs 15 which are of such shape that when the vehicle is in the water, the lugs may function to propel the vehicle through the water, and the lugs may, of course, also function to engage with the ground when the vehicle is on land. Further details of construction of the vehicle, such as of the suspension mechanism for the bogie wheels 12 and the shape of the lugs 15, are disclosed in the co-pending Swennes application hereinbefore mentioned.

Referring in particular to Fig. 2 of the drawings, the mechanism for driving the sprockets 14 and thereby the tracks 11 comprises a pair of motors 16 disposed adjacent opposite sides of the vehicle, a transmission 17 connected in tandem with each of the motors 16, shafting 18 driven by each of the transmissions 17, a right-angle gear drive 19 driven by the shafting on each side of the vehicle, a shaft 20 driven by each of the right-angle gear drives, a differential transmission 21 having a shaft 22 extending therethrough and driven by each of the shafts 20, a shaft 23 on each side of the transmission 21 and driven thereby, and a reduction gear set 24 driven by each of the shafts 23 and connected to drive the sprocket wheels 14. It is contemplated that the motors 16 shall be of the internal combustion type, and they may be of any suitable well-known construction. The transmissions 17 preferably provide neutral, reverse ratio and low and high froward speed ratio ranges, and the transmissions are each adapted to automatically shift between a plurality of low speed ratios in low speed range and to a higher speed ratio in high speed range in response to the speed of the driven shafting 18 of the transmission as well as in response to the opening of the throttle of the associated engine. A transmission of this type which may be used is shown in the patent to Thompson, No. 2,193,524, issued March 12, 1940. The internal constructions of the right-angle drives 19, the transmission 21 and the gear sets 24 may be as are shown in some detail in the aforesaid co-pending Swennes application. It will suffice to state with respect to these units in connection with the present invention, however, that each right-angle gear drive 19 is such as to transmit drive to a shaft 20 from the shafting 18 and each of the gear sets 24 transmits a reduced speed drive from a shaft 23 to a sprocket 14. The transmission 21 is of such construction that the shafts 23 on opposite sides of the transmission are driven when the shaft 22 is driven, and the shafts 23 may be selectively driven at different speeds for steering the vehicle. It will be noted that the single shaft 22 constitutes the input shaft of the transmission and is driven by both shafts 20, and either of the engines 16 may thus drive the sprockets 14 and thereby the tracks 11 regardless of whether the other engine is also operative.

Each of the transmissions 17 is provided with a pair of control levers 25 and 26 (see Figs. 2 and 5). The lever 25 is linked with a lever 27 which in turn is linked with the throttle 28 of the associated motor 16. The lever 27 is moved by means of a link 29, and the link functions to control the speed of the motor 16 due to its connection therewith. Due to the interconnection between the throttle 28 and the control lever 25 by means of lever 27, shifting of the transmission is in accordance with the opening of the engine throttle. It is contemplated that the links 29 for the transmissions and motors on both sides of the vehicle shall preferably be simultaneously controlled by an operator, and any suitable mechanism (not shown) may be used to facilitate such control.

The lever 26 for each of the transmissions 17 functions, when moved, to condition the transmission for neutral, reverse, low speed range or high speed range. Poppet means (not shown) of any suitable construction is preferably provided in the transmission for yieldingly holding the lever 26 in its positions providing these transmission conditions. The lever 26 is connected with a lever 30 by means of a link 31, and the lever 30 is connected with a lever 32 by means of a link 33. Both levers 30 and 32 are pivotally mounted at their centers with respect to the vehicle body 10. The lever 32 is connected with a bell crank 34 mounted on the right-angle drive 19 on that side of the vehicle with the particular transmission 17, and this connection is by means of a link 35. Each of the bell cranks 34 on both sides of the vehicle is connected by means of a link 36 with a bell crank 37, and the latter bell cranks are coaxially mounted on the transmission 21. The bell cranks 37 are connected by means of links 38 with levers 39 and 40. The levers 39 and 40 are parts of the control mechanism 41 mounted on the transmission 21 for use by the operator in controlling the transmissions 17, which mechanism will hereinafter be described in detail.

Referring now in particular to Figs. 3 and 4, the control mechanism 41 comprises a control lever 42 which is swingably mounted on a shaft 43 fixed in the transmission 21. A pair of quadrants 44 and 45 are rotatably mounted on the shaft 43 on opposite sides of the control lever 42. The quadrants 44 and 45 carry the levers 39 and 40 which are linked with the transmission controlling levers 26 as has been hereinbefore described. The quadrants 44 and 45 are each provided with a notch 46 in its periphery, and each of the quadrants is provided also with a projection 47 forming one side of the notch.

The control lever 42 is provided with a pair of plungers 48 on opposite sides of the lever. Each of the plungers is carried by the lever slidably disposed with respect to the lever by means of rib portions 49 and 50 formed on the lever between which the plunger is disposed and a casing 51 fixed with respect to the lever and extending around the rib portions 49 and 50. The plungers 48 on opposite sides of the lever are each adapted to fit in the notch 46 of the quadrant on the same side of the lever as the plunger, whereby to connect the lever 42 and the quadrant for movement together.

The plungers 48 are each adapted to be moved out of the respective notch 46 in the respective quadrant by means of a handle 52. The handle 52 is fixed to a shaft 53 which extends through a top plate portion 54 of the casing 51, and the shaft 53 is threaded in the plunger 48, so that there may be no relative movement longitudinally between the shaft and plunger but the shaft may rotate in the plunger. A spring 56 is disposed about the shaft 53 between the top plate portion 54 and the plunger 48, and the spring functions to urge the plunger downwardly and to yieldingly hold it in the slot 46 of its respective quadrant. The rib portion 49 is provided with a notch 57 on its top for receiving the handle 52, and the notch functions to hold the handle 52 from jarring out of its position corresponding to the position of the plunger in a notch 46. The casing 51 is provided with an upwardly extending portion 58 having a notch 59 therein for receiving the handle 52. The casing portion 58 functions to hold the handle and thereby the shaft 53 and plunger 48 in raised position, and the notch 59 prevents the handle from jarring out of this position. The plunger 48 in such a raised position is out of the notch 46 but may contact the projection 47 if the plunger and projection move toward each other about the shaft 43.

When the plungers 48 on both sides of the control lever 42 are in the notches 46 of both quadrants 44 and 45, both of the quadrants move along with the lever 42. The connections between the levers 39 and 40 and the shift levers 26 of the transmission 17 are such that the latter levers of both transmisions are swung through the same angle and in the same direction when the quadrants 44 and 45 are simultaneously rotated by the lever 42. It will be noted that, although the point in the lever 40 at which a link 38 is connected is farther from the axis of the shaft 43 than is the corresponding point in the lever 39, that arm of a bell crank 37 connected with the lever 40 is longer than that arm of the other bell crank 37 connected with the lever 39, so that the two cranks 37 rotate through substantially the same angle. It will be observed that the two bell cranks 34 on opposite sides of the vehicle are mounted oppositely with respect to each other, so that a movement in the same direction of the links 36 on opposite sides of the transmission 21 causes movement in the same direction of the links 35 on both sides of the vehicle. When the control lever 42 is in its position as shown in Figs. 3 and 4, of the drawings, the shifting levers 26 of the transmissions 17 are positioned to establish neutral conditions in the transmissions. When the control lever 42 is rotated about the shaft 43 in a clockwise direction as seen in Fig. 4, both transmissions are shifted by means of their shifting levers 26 into low range in which the transmissions automatically shift between a plurality of low speed ratios. A further movement of the lever 42 in this direction shifts the transmissions into high range in which they automatically shift to higher speed ratios, and a still further movement of the control lever 42 shifts the transmissions to provide reverse.

In amphibian vehicles, of the illustrated type having a pair of motors on opposite sides, it sometimes happens that one or the other of the motors becomes inoperative due to having been wetted. In this case, the control lever 42 of the illustrated control mechanism may be utilized for shifting one of the transmissions 17 to a power transmitting condition while permitting the other transmission to remain in neutral condition, whereby the motor 16 connected with the latter transmission does not act as a load on the operative motor. In order to disconnect the transmission of the inoperative motor from the control lever 42, the plunger 48 for the quadrant 44 or 45 of that transmission is raised by rotating the handle 52 and bringing it into the notch 59. The control lever 42 and the other quadrant may thereafter rotate while the first quadrant remains in its neutral position as shown in Fig. 4 at this time, as no motion-imparting interlocking connection between the latter quadrant and the transmission of the inoperative motor is had and, in the event, this quadrant should have a tendency to rotate with the lever 42, due to the engaged contiguous sides of the bearing portions thereof rotatably mounted on the fixed shaft 43, the inertia of the quadrant and the linkage connecting the latter and its transmission will prevent rotation of the quadrant whereby the same will be held in neutral position. The projection 47 on each of the quadrants 44 and 45 is of such height that, even though the plunger 48 for a quadrant is in its raised position with the handle 52 being in the notch 59, the plunger 48 contacts the projection 47 of the quadrant if the lever 42 is moved toward its neutral position and the quadrant is in other than its neutral position. The projections 47 on the quadrants 44 and 45 thereby assure that the quadrants will be moved to their neutral positions when the control lever 42 is moved to its neutral position.

Although the transmissions 17 are each preferably provided with poppet means (not shown) for yieldingly positioning its shift lever 26 in each of the four principal positions thereof corresponding to neutral, low range, high range, and reverse; it has nevertheless been found in such a vehicle, particularly in rough seas, that it is difficult to properly position the control lever 42 and effectively shift between high range and low range without inadvertently shifting the transmissions into neutral or reverse. Mechanism is therefore provided for selectively limiting movement of the control lever 42 between low and high range positions such that when the lever 42 is moved to one limit of its movement, the transmissions are conditioned for low range and when the lever 42 is moved to the other limit of its movement, the transmissions are conditioned for high range. This mechanism comprises a quadrant plate 60 fixed with respect to the shaft 43 and provided with a central notch 61 and one sided notches 62 and 63 on opposite sides of the notch 61. A pawl 64 is swingably mounted on the control lever 42 and is adapted to be positioned in one of the notches 61, 62, and 63, depending on the rotative position of the lever 42. A rod 65 at one end thereof is connected with the pawl 64 by means of a bifurcated member 66, and the rod 65 is connected at its other end with a hand lever 67 pivotally mounted on the upper end of the control lever 42 by means of which the pawl may be moved out of the notches 61, 62, and 63 as is apparent. The rod 65 extends through a projection 68 formed on the lever 42, and a spring 69 is provided between the projection 68 and the member 66. The spring 69 functions to yieldingly maintain the pawl 64 in the notches 61, 62, and 63, as is evident. Each of the quadrants 44 and 45 is preferably provided with a stop shaft 70 which is adapted to contact the edge of the quadrant plate 60, and these shafts function to limit the motion of the quadrants in a counterclockwise direction as seen in Fig. 4.

When the control lever 42 is shifted in a clockwise direction from neutral position to condition the transmissions 17 from low range to high range, the pawl 64, due to the action of the spring 69 moves into the notch 61. With the pawl 64 being in the notch 61, when the control lever 42 is moved to its counterclockwise limit of movement with the pawl 64 in abutting contact with an end of the notch 61, the transmissions 17 are conditioned for low range and when the control lever 42 is moved to the other limit of its movement with the pawl 64 abutting the other end of the notch 61, the transmissions 17 are conditioned for high range. Thus it will be apparent that when the pawl 64 is in the notch 61, the control lever 42 may be effectively utilized to shift the transmissions between their high and low ranges without any danger of shifting the transmissions into either neutral or reverse, as might otherwise easily happen when the vehicle is violently pitching in a rough sea. If it is desired to shift the transmissions into either reverse or neutral from the forward power transmitting conditions, it is simply necessary to withdraw the pawl 64 from the notch 61 by means of the hand lever 67, and the control lever 42 may then be shifted for accordingly shifting the transmissions.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In a boat, the combination of means on the exterior of the boat for propelling the boat, a pair of motors in the boat disposed on opposite sides thereof, power transmitting means for operatively connecting said motors and said propelling means and including a transmission for each of said motors, each of said transmissions being adapted to be conditioned for neutral or to be power transmitting in two different speed ratios, means for shifting said transmissions, a control lever connected to said shifting means and adapted in a single movement to actuate the shifting means to simultaneously shift the transmissions to provide successively all of said conditions, and means selectively operable for limiting the movement of said lever whereby the transmissions may be shifted into only said power transmitting conditions and exclusive of neutral.

2. In a boat, the combination of means on the exterior of the boat for propelling the boat, a pair of motors in the boat disposed on opposite sides of the boat, power transmitting means for operatively connecting said motors and said propelling means and including a transmission for each of said motors, each of said transmissions being adapted to be conditioned for neutral or to be power transmitting in two different speed ratio ranges or in reverse and to be automatically shiftable between various speed ratios in each of said ranges, means for shifting said transmissions, a control lever connected to said shifting means and adapted in a single movement to actuate the shifting means to simultaneously shift the transmissions to provide successively all of said conditions, and means selectively controlled for limiting the movement of said lever whereby the transmissions may be shifted into only said power transmitting conditions and exclusive of neutral and reverse.

3. In a boat, the combination of means on the exterior of the boat for propelling the boat, a pair of motors in the boat disposed on opposite sides of the boat, power transmitting means for operatively connecting said motors and said propelling means and including a transmission for each of said motors, each of said transmissions being adapted to be conditioned for neutral or to be power transmitting in two different forward speed ratio ranges or reverse and to be automatically shiftable between various speed ratios in each of said ranges, means for shifting both of said transmissions, a control lever connected to said shifting means and adapted in a single movement to actuate said shifting means to shift the transmissions to provide successively all of said conditions, a quadrant plate non-rotatably and coaxially disposed with respect to said lever, a pawl carried by said lever and adapted to contact said plate, said plate having a notch therein for receiving said pawl for limiting the movement of said lever whereby the transmissions may be shifted into only said forward power transmitting conditions and exclusive of neutral and reverse, and means for withdrawing said pawl from said notch.

4. In combination, a pair of transmissions each adapted to be conditioned for neutral or to be power transmitting in a plurality of different forward speed ratios, a control lever for shifting said transmissions and adapted in a single movement to shift the transmissions to provide successively all of said conditions, and means controlled by the operator for limiting the movement of said lever whereby the transmissions may be shifted into only said power transmitting conditions and exclusive of neutral.

5. In combination, a pair of transmissions each adapted to be conditioned for neutral or to be power transmitting in a plurality of different forward speed ratios or in reverse, a control lever for shifting said transmissions and adapted in a single movement to shift the transmissions to provide successively all of said conditions, a fixed quadrant plate coaxially disposed with respect to said lever, a pawl carried by said lever and adapted to contact said plate, said plate having a notch therein for receiving said pawl for limiting the movement of said lever whereby the transmissions may be shifted into only said forward power transmitting conditions and exclusive of neutral and reverse, and means under the control of the operator for withdrawing the pawl from said notch.

6. In a boat, the combination of means on the exterior of the boat for propelling the boat, a pair of internal combustion engines in the boat disposed adjacent opposite sides of the boat, power transmitting means for operatively connecting said engines and said propelling means whereby each engine can drive the propelling means and including a transmission for each of the engines, each of said transmisssions being adapted to be shifted to be conditioned for neutral or to be power transmitting, means for shifting said transmissions, a control lever connected to said shifting means for actuating the same to jointly shift both of said transmissions, and means for selectively disconnecting either of said shifting means from said control lever whereby one of the transmissions may be shifted to a power transmitting condition while the other transmission is left in neutral condition.

7. In a boat, the combination of means on the exterior of the boat for propelling the boat, a pair of internal combustion engines in the boat disposed adjacent opposite sides of the boat, power transmitting means for operatively connecting said engines and said propelling means whereby each engine can drive the propelling means and including a transmission for each of the engines, each of said transmissions being adapted to be shifted to be conditioned for neutral or to be power transmitting in a plurality of speed ratios, a pair of coaxially rotatable shifting members each connected with one of said transmissions to shift the transmission, a control lever coaxially rotatable with said shifting members and disposed therebetween, said shifting members each being provided with a notch on its periphery, and a pair of plungers carried by said control lever and each adapted to engage in the notch of its respective shifting member for coupling together the shifting member and control lever, whereby the transmissions may be shifted together or one of the transmissions may be shifted to power transmitting condition while the other transmission is left in neutral condition.

8. In combination, a pair of transmissions each driven by a motor, each of said transmissions being adapted to be shifted to be conditioned for neutral or to be power transmitting in a plurality of speed ratios, a pair of coaxially rotatable shifting members each connected with one of said transmissions for shifting the transmission, a control lever coaxially rotatable with said shifting members and disposed between the members, each of said members on its periphery being provided with a notch, and a pair of plungers carried by said control lever each engageable in the notch of one of said shifting members for coupling the member and control lever, whereby the transmissions may be shifted together when said plungers are each engaged in their respective notches in the shifting members, or one of the transmissions may be shifted to a power transmitting condition while the other transmission is left in neutral condition when one plunger is engaged in the shifting member which is connected with said one transmission and the other plunger is disengaged from the notch in the shifting member which is connected with said other transmission.

9. In combination, a pair of transmissions each adapted to be driven by a motor, each said transmission adapted to be shifted to condition it for neutral or to be power transmitting in a plurality of speed ratios; a pair of coaxially rotatable shifting members each connected with one of said transmissions for shifting the transmission, each member having a peripheral notch; a control lever coaxially rotatable with said shifting members; a pair of plungers carried by said control lever, each plunger engageable in the notch of a shifting member for coupling the member and the control lever; a recessed arcuate plate fixed coaxial with respect to said shift members, said recess providing spaced abutments; a device carried by said control lever adapted when moved by said lever to enter said recess and while therein to limit the movement of said lever to selected speed ratios of said transmission; and stops on said shifting members adapted to engage said fixed arcuate plate to limit movement of said shifting members in one direction; whereby the transmissions may be shifted together or one of the transmissions may be shifted to a power transmitting condition while the other transmission remains in neutral condition.

10. In combination, a pair of transmissions each adapted to be driven by a motor, each said transmission adapted to be shifted to condition it for neutral or to be power transmitting in a plurality of speed ratios; a pair of coaxially rotatable shifting members each connected with one of said transmissions for shifting the transmission, each member having a peripheral notch; a control lever coaxially rotatable with said shifting members, a pair of plungers carried by said control lever, each plunger engageable in the notch of a shifting member for coupling the member and the control lever; a recessed arcuate plate fixed coaxial with respect to and intermediate said shift members, said recess providing spaced abutments; a manually operable pawl fulcrumed on and carried by said control lever, said pawl adapted when moved by said lever to enter said recess and move therein to a selected abutment for limiting the movement of said lever to selected forward speed ratios of said transmission; and stops on said shifting members adapted to engage said fixed arcuate plate to limit movement of said shifting members in one direction; whereby the transmissions may be shifted together or one of the transmissions may be shifted to any of power transmitting conditions while the other transmission remains in netural condition.

11. Control means for a pair of motor driven transmissions each of which transmissions is adapted to be shifted to be conditioned for neutral or to be power transmitting in a plurality of speed ratios, said control means comprising a pair of coaxially disposed members each connected with one of said transmissions for shifting it, a control lever between and coaxially mounted with respect to said members, fixed spaced abutments positioned coaxially with respect to said members, a device carried by said control lever and adapted for movement between said abutments for positively defining limits of movement of said lever when shifting said transmissions to condition them for forward power transmitting speed ratios, and means for selectively connecting each of said members with said control lever whereby the transmissions may be shifted together or one of the transmissions may be shifted to a power transmitting condition while the other transmission is left in neutral condition.

12. Control means for a pair of motor driven transmissions each of which transmissions is adapted to be shifted to be conditioned for neutral or to be power transmitting in a plurality of speed ratios, said control means comprising a pair of coaxially disposed shifting members each connected with one of said transmissions for shifting it, a control lever between and coaxially mounted with respect to said members, each of said members being provided with a notch on its periphery, fixed spaced abutments positioned coaxially with respect to said members, a device carried by said control lever and adapted for movement between said abutments for positively defining limits of movement of said lever when shifting said transmissions to condition them for forward power transmitting speed ratios, and a pair of plungers carried by said shift lever and each adapted to engage in the notch of one of said shifting members, whereby the shifting members may be operated either individually or together for correspondingly shifting the transmissions.

13. Control means for a pair of motor driven transmissions each of which transmissions is adapted to be shifted to be conditioned for neutral or to be power transmitting in a plurality of speed ratios, said control means comprising a pair of coaxially disposed shifting members each connected with one of said transmissions for shifting it, a control lever coaxially mounted with respect to and disposed between said shifting members, each of said shifting members having a notch on its periphery, a pair of plungers carried by said control lever each for engaging in the notch of one of said shifting members whereby to couple the control lever and shifting member; and a projection on the periphery of each of said shifting members adapted to be engaged by the respective plunger when the plunger is in retracted position out of its respective notch, whereby both of the transmissions are shifted to neutral condition together when the plungers are in either their operative or retracted position.

14. In combination, a pair of transmissions each driven by a motor, each of said transmissions being adapted to be shifted to be conditioned for neutral or to be power transmitting in a plurality of speed ratios; a pair of coaxially disposed shifting members each connected with one of said transmissions for shifting it; a control lever coaxially rotatable with and disposed between the shifting members and being adapted in connection with said members to shift the transmissions in a single movement to provide successively all of said conditions, each of said members on its periphery being provided with a notch; and a pair of plungers carried by said control lever, each plunger being engageable in the notch of one of said shifting members for coupling the member and control lever; whereby the transmissions may be shifted together, when each of the plungers is engaged in the notch in its respective shifting member, or one of the transmissions may be shifted to a power transmitting condition while the other transmission is left in neutral condition, when one of said plungers is engaged in the notch of the shifting member which is connected with said one transmission and the other plunger is disengaged from the notch of the shifting member which is connected with said other transmission.

15. In combination, a pair of transmissions each driven by a motor, each of said transmissions being adapted to be shifted to be conditioned for neutral or to be power transmitting in a plurality of forward speed ratios or in reverse; a pair of coaxially disposed shifting members each connected with one of said transmissions for shifting it; a control lever coaxially rotatable with and disposed between the shifting members and being adapted in connection with said members to shift the transmissions in a single movement to provide successively all of said conditions, each of said members on its periphery being provided with a notch; and a pair of plungers carried by said control lever, each plunger being engageable in the notch of one of said shifting members for coupling the member ond control lever; whereby the transmissions may be shifted together, when each of the plungers is engaged in the notch of its respective shifting member, or one of the transmissions may be shifted to a power transmitting condition while the other transmission is left in neutral condition, when one of said plungers is engaged in the notch of the shifting member which is connected with said one transmission and the other plunger is disengaged from the notch in the shifting member which is connected with said other transmission.

16. In a motor driven vehicle of the type comprising means on the exterior of the vehicle for propelling the vehicle, a pair of motors in the vehicle, means for operatively connecting said motors and said propelling means whereby each motor can drive the propelling means and including a transmission for each of the motors, each of said transmissions being adapted to be shifted to be conditioned for neutral or to be power transmitting in a plurality of speed ratios, the improvement which consists of a pair of coaxially disposed members each connected with one of said transmissions for shifting the transmission, a control lever between said members and coaxially mounted with respect to the members, fixed spaced abutments coaxial to said members, a device carried by said control lever adapted for movement between said abutments for positively defining limits of movement of said lever when shifting said transmissions to condition them for forward power transmitting speed ratios, and means for selectively connecting each of said members with said control lever whereby the transmissions may be shifted together or one of the transmissions may be shifted to a power transmitting condition while the other transmission is left in neutral condition.

17. In a motor driven vehicle of the type comprising means on the exterior of the vehicle for propelling the vehicle, a pair of motors in the vehicle, means for operatively connecting said motors and said propelling means whereby each motor can drive the propelling means and including a transmission for each of the motors, each of said transmissions being adapted to be shifted to be conditioned for neutral or to be power transmitting in a plurality of speed ratios, the improvement which consists of a pair of coaxially rotatable shifting members each connected with one of said transmissions for shifting the transmission, a control lever between the members and coaxially mounted with respect to the members, each of said members being provided with a notch on its periphery, fixed spaced abutments coaxial to said members, a device carried by said control lever adapted for movement between said abutments for positively defining limits of movement of said lever when shifting said transmissions to condition them for forward power transmitting speed ratios, and a pair of plungers carried by said shift lever and each adapted to engage in the notch of one of said shifting members, whereby the shifting members may be operated either individually or together for correspondingly shifting the transmissions.

18. In a motor driven vehicle of the type comprising means on the exterior of the vehicle for propelling the vehicle, a pair of motors in the vehicle, means for operatively connecting said motors and propelling means whereby each motor can drive the propelling means and including a transmission for each of the motors, each of said transmissions being adapted to be shifted to be conditioned for neutral or to be power transmitting in a plurality of speed ratios, the improvement which consists of a pair of coaxially rotatable shifting members each connected with one of said transmissions for shifting the transmission, a control lever coaxially mounted with respect to said shifting members and disposed therebetween, each of said shifting members having a notch on its periphery, fixed spaced abutments coaxial to said members, a device carried by said control lever adapted for movement between said abutments for positively defining limits of movement of said lever when shifting said transmissions to condition them for forward power transmitting speed ratios, a pair of plungers carried by said control lever each for engaging in the notch of one of said shifting members whereby to couple the control lever and shifting member, and a projection on the periphery of each of said shifting members adapted to be engaged by the respective plunger when the plunger is in retracted position out of its respective notch whereby both of the transmissions are shifted to neutral condition together when the plungers are in either their operative or retracted positions.

19. In combination, a pair of transmissions each adapted to be conditioned for neutral or to be power transmitting in a plurality of different speed ratios, a control lever for shifting said transmissions and adapted in a single movement to shift the transmissions to provide successively all of said conditions, and means controlled by the operator for limiting the movement of said lever whereby the transmissions may be shifted into only said power transmitting conditions and exclusive of neutral and reverse.

20. In combination, a pair of transmissions each adapted to be conditioned for neutral or to be power transmitting in a plurality of different forward speed ratios, a control lever for shifting said transmissions and adapted in a single movement to shift the transmissions to provide successively all of said conditions, a fixed quadrant plate coaxially disposed with respect to said lever, a pawl carried by said lever and adapted to contact said plate, said plate having a notch therein for receiving said pawl for limiting the movement of said lever whereby the transmissions may be shifted into only said forward power transmitting conditions and exclusive of neutral, and means under the control of the operator for withdrawing the pawl from said notch.

MILTON B. ANDERSON.

REFERENCES CITED

The following references are of record in the file of this patent:

UNITED STATES PATENTS

| Number | Name | Date |
|---|---|---|
| 858,538 | Remington | July 2, 1907 |
| 1,160,259 | Cassidy | Nov. 16, 1915 |
| 1,208,751 | Compton | Dec. 19, 1916 |
| 1,224,826 | Wiser | May 1, 1917 |
| 1,269,581 | Daimler et al. | June 18, 1918 |
| 1,568,578 | Weeks | Jan. 5, 1926 |
| 1,622,004 | Schwagermann | Mar. 22, 1927 |
| 1,629,804 | Melcher | May 24, 1927 |
| 1,696,439 | Knox | Dec. 25, 1928 |
| 1,738,523 | Campbell et al. | Dec. 10, 1929 |
| 1,880,126 | Fageol | Sept. 27, 1932 |
| 1,933,873 | Osman | Nov. 7, 1933 |
| 2,132,450 | Wolf | Oct. 11, 1938 |
| 2,138,207 | Roebling | Nov. 29, 1938 |
| 2,233,188 | Ward | Feb. 25, 1941 |
| 2,266,784 | Matteucci | Dec. 23, 1941 |
| 2,267,066 | Wolf | Dec. 23, 1941 |
| 2,268,601 | Knox | Jan. 6, 1942 |
| 2,288,173 | Wohanka | June 30, 1942 |
| 2,289,654 | Keel et al. | July 14, 1942 |
| 2,318,726 | Wagner | May 11, 1943 |
| 2,339,049 | Brown et al. | Jan. 11, 1944 |
| 2,344,730 | Ramsey | Mar. 21, 1944 |
| 2,367,076 | Varblow | Jan. 9, 1945 |